United States Patent [19]

Matsuura et al.

[11] Patent Number: 4,827,522

[45] Date of Patent: May 2, 1989

[54] PATTERN RECOGNITION APPARATUS FOR DETERMINING A REFERENCE PATTERN BY K-L EXPANSION UTILIZING A POWER METHOD

[75] Inventors: Hiroshi Matsuura, Odawara; Shoichi Hirai, Yokohama, both of Japan

[73] Assignee: Kabushiki Kaisha Toshiba, Kawasaki, Japan

[21] Appl. No.: 911,459

[22] Filed: Sep. 25, 1986

[30] Foreign Application Priority Data

Sep. 27, 1985 [JP] Japan .................................. 60-212543

[51] Int. Cl.[4] ............................................. G10L 5/06
[52] U.S. Cl. .................................... 381/43; 364/513.5
[58] Field of Search ............................. 381/41, 42, 43; 364/513.5

[56] References Cited

U.S. PATENT DOCUMENTS

| | | | |
|---|---|---|---|
| 3,981,443 | 9/1976 | Lynch et al. ......................... | 364/715 |
| 4,068,311 | 1/1978 | Whitehouse et al. ................ | 364/827 |
| 4,152,772 | 3/1979 | Speiser et al. ....................... | 364/725 |
| 4,164,023 | 8/1979 | Whitehouse et al. ................ | 364/862 |
| 4,254,399 | 3/1981 | Burkhardt et al. .............. | 364/725 X |
| 4,381,418 | 4/1983 | Kolesar et al. .................... | 364/513.5 |
| 4,625,287 | 11/1986 | Matsuura et al. ................. | 364/513.5 |
| 4,651,289 | 3/1987 | Maeda et al. ...................... | 364/513.5 |
| 4,661,913 | 4/1987 | Wu et al. ............................... | 364/500 |
| 4,783,802 | 11/1988 | Takebayashi et al. ................. | 381/41 |

OTHER PUBLICATIONS

ICASSP 87–IEEE International Conference on Acoustics, Speech, and Signal Processing, Tampa, Mar. 26–29, 1985, vol. 1, pp. 21–24, IEEE New York, U.S.; K.L. Brown et al.: "Discrete Utterance Speech Recognition Without the Alignment".

*Primary Examiner*—William M. Shoop, Jr.
*Assistant Examiner*—Marc S. Hoff
*Attorney, Agent, or Firm*—Oblon, Fisher, Spivak, McClelland & Maier

[57] ABSTRACT

Disclosed is a pattern recognition and learning apparatus which compares an input pattern with a reference patterns to recognize a category of the input pattern, and learns a reference pattern from input patterns of a specific category. Learning of input patterns for obtaining a reference pattern is performed by means of Kathunen-Loeve expansion of a covariance matrix of input patterns using a power method.

9 Claims, 5 Drawing Sheets

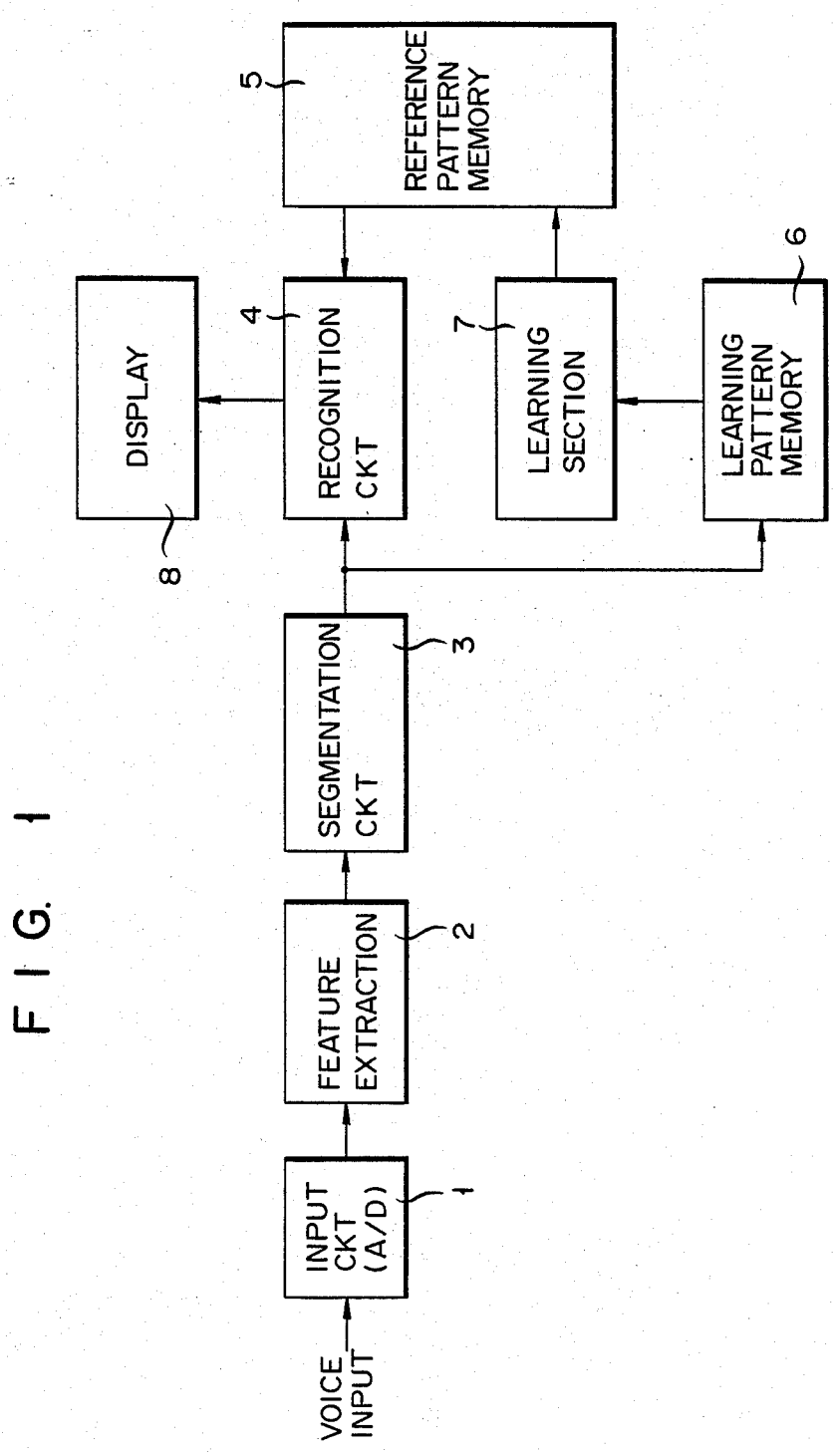
F I G. 1

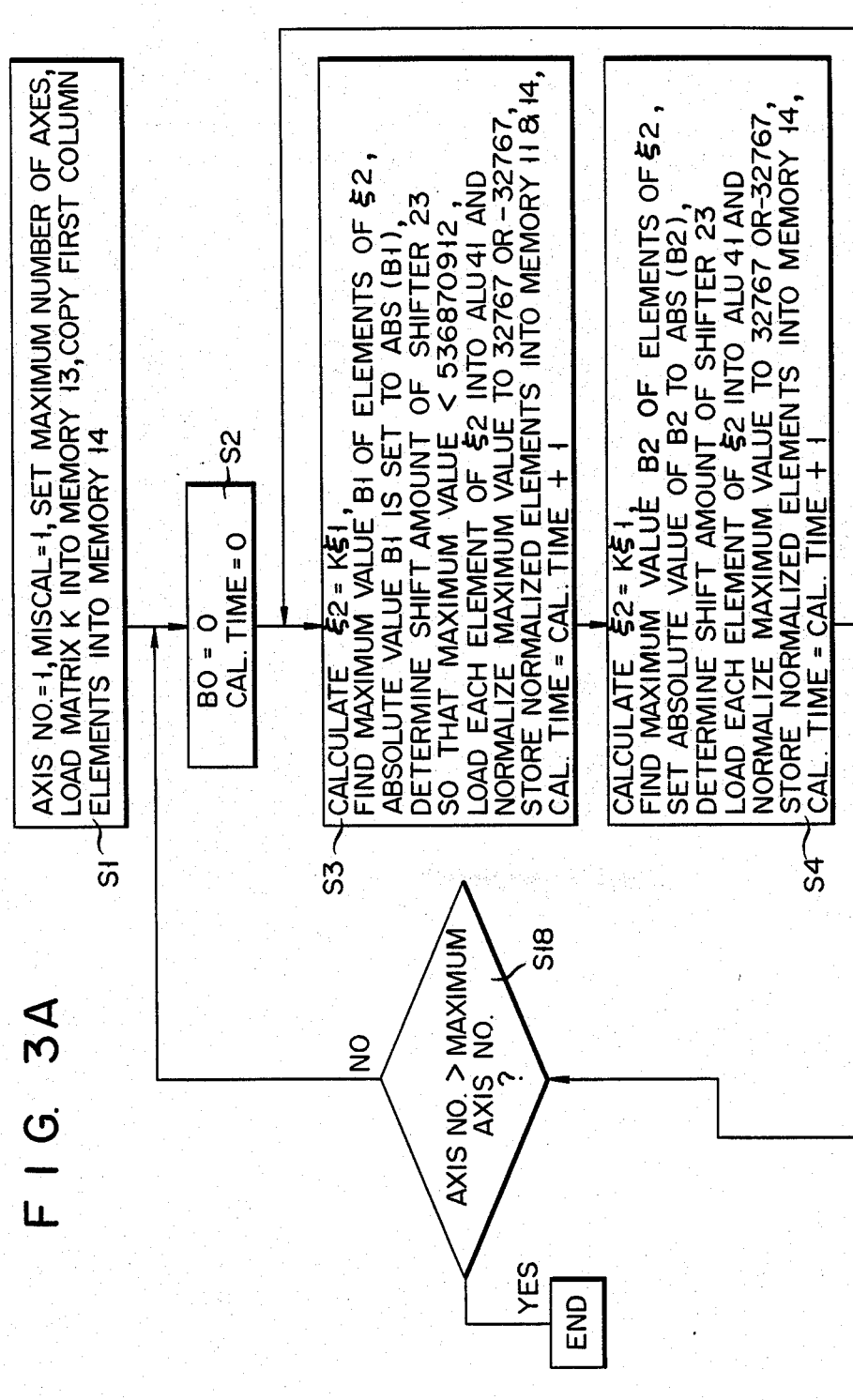
F I G. 3A

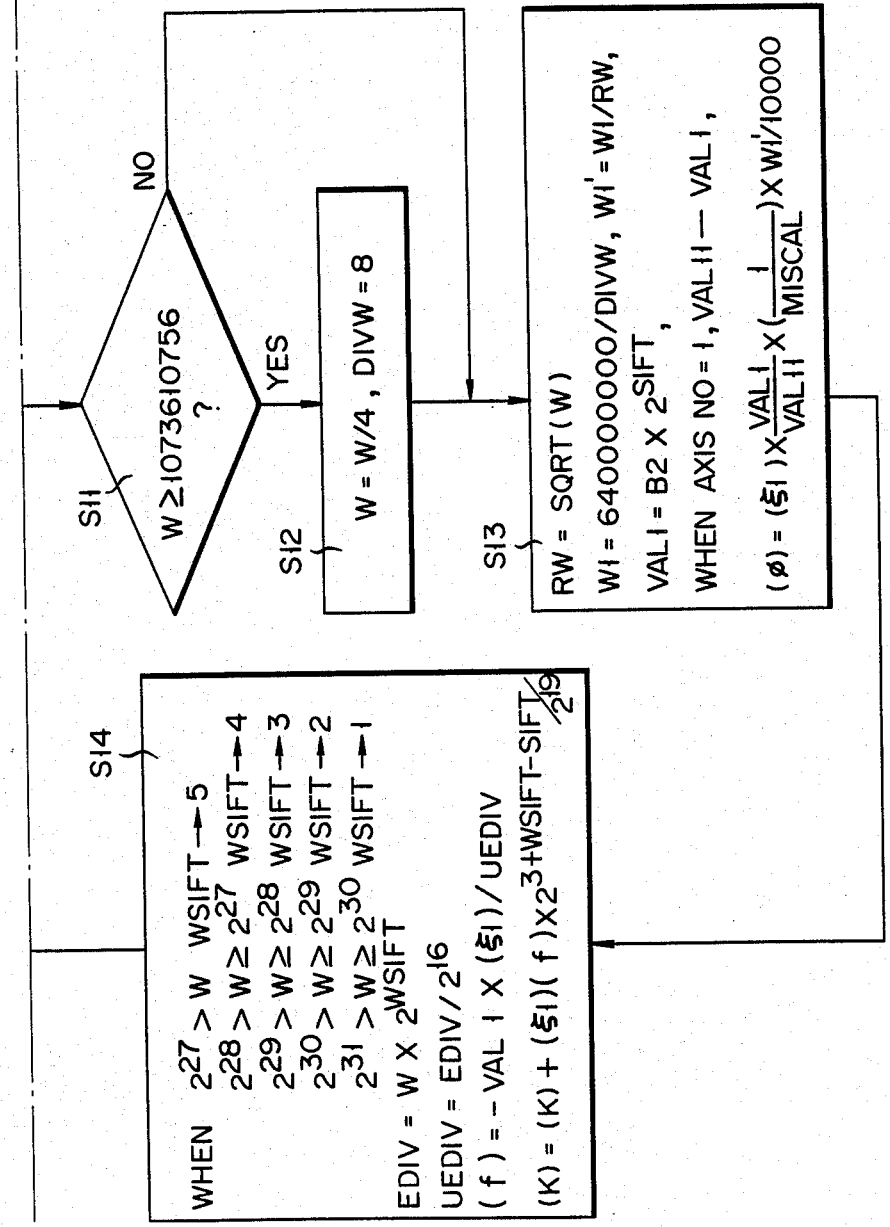

PATTERN RECOGNITION APPARATUS FOR DETERMINING A REFERENCE PATTERN BY K-L EXPANSION UTILIZING A POWER METHOD

BACKGROUND OF THE INVENTION

The present invention relates to a pattern recognition and learning apparatus for obtaining a reference pattern used for recognition processing from input patterns of a specific category.

A pattern recognition apparatus for recognizing input patterns, such as voices or characters, has been developed. In the pattern recognition apparatus, an input pattern is compared with recorded reference or standard patterns, and the category of a reference pattern which has the highest similarity with the input pattern is obtained as a recognition result. In order to improve recognition capabilities, learning of reference patterns is necessary. New recording or registration of reference patterns in a dictionary memory is normally called learning of the reference patterns. A plurality of patterns of a known category, which are input for learning, are recorded or stored in a memory as reference patterns of the category in the same form as input patterns to be recognized.

In such a reference pattern recording method, since recognition processing is performed by a comparison (matching) between recorded or registered patterns and an input pattern, patterns uttered by the same talker at substantially the same time can be referred to as needed. However, in the case of the reference patterns registered in this method, a statistical distribution in patterns to be recognized is not taken into consideration. Therefore, the recognition method of this type is normally adopted for recognition of input patterns whose variation is small.

Recognition methods in consideration of the statistical distribution in patterns, such as Mahalanobis's recognition method using generalized distance system or a multiple similarity method, are known. In these methods, since reference patterns are made in consideration of the statistical distribution of patterns, a large number of sample patterns must be collected. In this case, statistical analysis of sample patterns is significantly difficult to achieve.

In the pattern recognition method of this type, since it is difficult to learn reference patterns, learning of patterns is performed in advance using a computer, and reference patterns thus prepared are recorded in a recognition apparatus.

In the multiple similarity method, the statistical distribution of patterns to be recognized is taken into consideration for preparing reference patterns. Therefore, recognition performance of this method is considerably superior to the recognition method wherein learning patterns are simply registered as the reference patterns. However, in order to prepare reference patterns in consideration of the statistical distribution, a method such as Karhunen-Loeve expansion (to be referred to as KL expansion hereinafter) is necessary, and this is not easy.

Known methods of KL expansion are the Jacobi method and Householder & Sturm method. The former method is relatively simple in computation procedure but requires a large volume of computation. The latter method requires a complex computation procedure and is difficult to apply to an apparatus.

Therefore, in a conventional apparatus, a high-performance computer separate from the pattern recognition apparatus is used to obtain reference patterns.

SUMMARY OF THE INVENTION

It is an object of the present invention to provide a pattern recognition and learning apparatus which can efficiently obtain reference patterns for high recognition performance.

According to the present invention, there is provided a pattern recognition and learning apparatus which compares an input pattern with a reference pattern to recognize a category of the input pattern, and obtains a reference pattern from input patterns of a specific category, wherein the pattern recognition and learning apparatus performs learning of the reference pattern by means of Karhunen-Loeve expansion of a covariance matrix of the input patterns using a power method.

BRIEF DESCRIPTION OF THE DRAWINGS

FIG. 1 is a schematic block diagram of a pattern recognition apparatus according to an embodiment of the present invention;

FIGS. 3A, 3B and 3C show, in combination, a flow chart for explaining KL expansion in the pattern learning apparatus shown in FIGS. 2A and 2B.

DETAILED DESCRIPTION OF THE PREFERRED EMBODIMENT

Figure 2A:
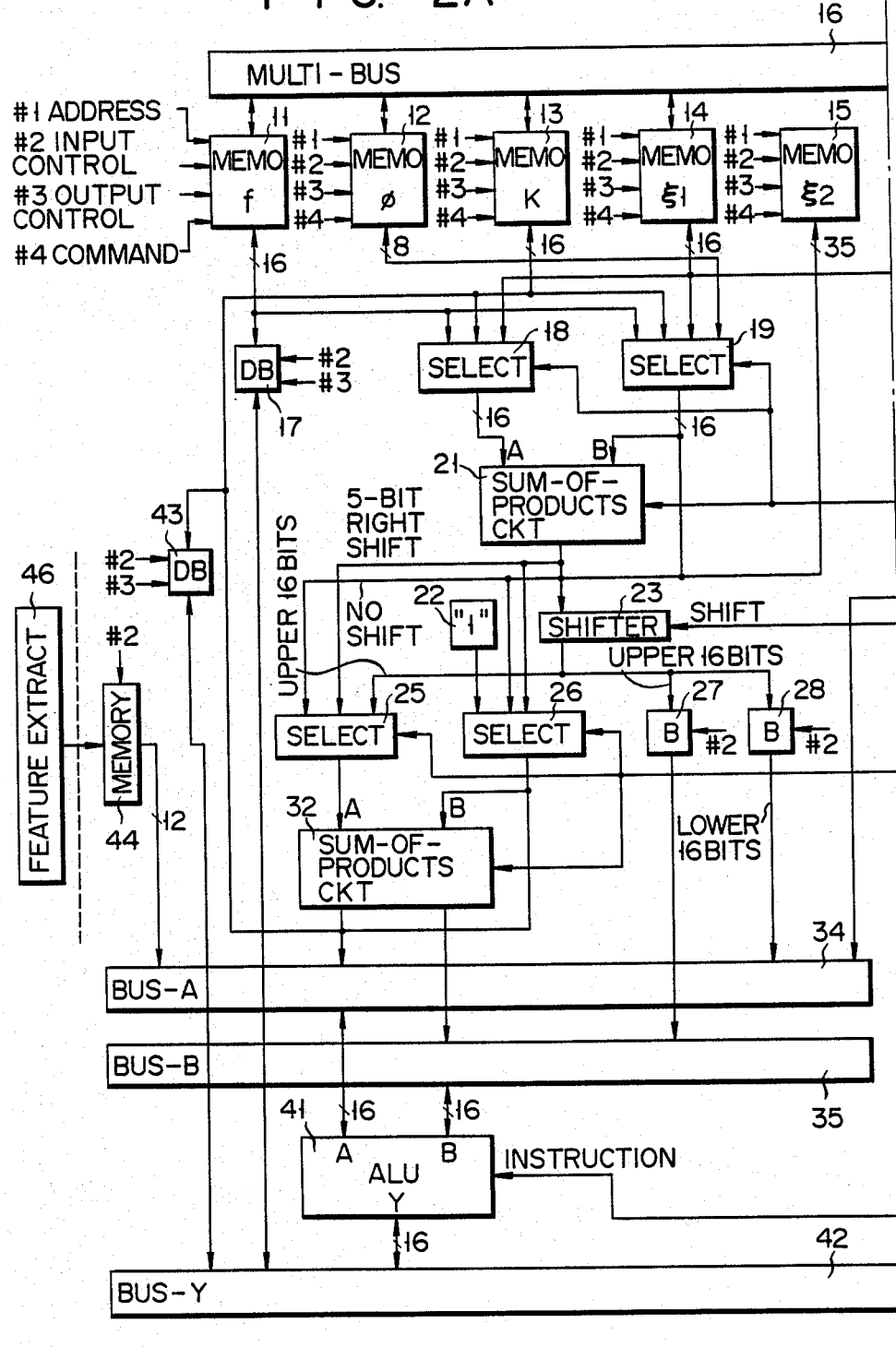
FIGS. 2A and 2B show, in combination, a detailed block diagram of a pattern learning apparatus of the present invention.

FIG. 1 shows the schematic arrangement of a voice recognition apparatus according to an embodiment of the present invention. An input voice signal is converted to, e.g., a 12-bit digital voice signal by voice input circuit 1. The digital voice signal is supplied to feature extractor 2 to extract voice-recognition acoustic parameters. Feature extractor 2 comprises 16 bandpass filters for dividing a frequency band, e.g., from 200 Hz to 5.4 kHz into 16 channels. The output signals of the 16 bandpass filters are used as vowel-recognition acoustic parameters. The output signals of eight pairs of bandpass filters are used as consonant-recognition acoustic parameters. Each pair of bandpass filters consists of two bandpass filters for adjacent frequency bands. Each acoustic parameter is expressed by 8 bits.

Feature extractor 2 may be arranged to obtain, as acoustic parameters, cepstrum coefficients or part of various parameters obtained through correlation analysis.

The acoustic parameters of the input voice pattern obtained by extractor 2 are supplied to sedimentation circuit 3, and are segmented for each mono syllable. Segmentation of the acoustic parameters is performed based on variations in the input voice power level.

In the case of vowels, one frame (e.g., 10 msec) of a vowel portion of the input voice pattern is segmented to provide a recognition and learning vowel pattern consisting of the output signals of the 16-channel bandpass filters, and expressed by a 16-dimensional vector consisting of the following 16 elements:

$$\begin{pmatrix} a1 \\ a2 \\ \vdots \\ a16 \end{pmatrix} \quad (1)$$

In the case of consonants, eight frames including a transition portion from a vowel to a consonant are segmented to provide a consonant recognition and learning pattern. In the consonant recognition pattern, the output signals of the 8-channel bandpass filters are each sampled at eight points on the time axis, thereby providing the consonant recognition pattern represented by a 64-dimensional vector consisting of the following 64 elements:

$$\begin{pmatrix} b11 \\ b12 \\ b13 \\ \vdots \\ b18 \\ b21 \\ b22 \\ \vdots \\ b88 \end{pmatrix} \quad (2)$$

Recognition processing of the thus obtained vowel and consonant patterns is performed by recognition circuit using reference patterns stored in reference pattern memory 5.

Assuming that a vector of the input pattern is given by f and a reference pattern of category l is given by $\{\phi n^{(l)}\}$, the recognition processing is executed based on the following calculation according to the compound similarity method:

$$S^{(l)}[f] = \sum_{n=1}^{N} \{an^{(l)} \cdot (f \cdot \phi n^{(l)})^2 / \|f\|^2\} \quad (3)$$

This calculation is made by dividing a product of scalar product $(f, \phi n)$ of vector f of the input pattern and each reference pattern $\phi n$ of a set $\{\phi n^{(l)}\}$, $(n=1$ to $N)$ of N reference patterns belonging to an identical category, and coefficient $an^{(l)}$ determined by an eigen value of reference pattern $\phi n$, with the second power of the norm $\|f\|$ of vector f of the input pattern. Coefficient $an^{(l)}$ can take positive and negative values, and if it is negative, a difference from another category is emphasized. If coefficient $an^{(l)}$ takes only a positive value, the similarity method in equation (3) is the same as the multiple similarity method.

The similarity calculation is executed between the input pattern and the reference patterns of all the categories, and the category l of a reference pattern having the maximum similarity $S^{(l)}[f]$ is obtained as the recognition result. The recognition result is displayed in an appropriate form on display 8.

The similarity is calculated in accordance with the following relation in practical hardware:

$$S^{(l)}[f] = \left\{ \sum_{i=0}^{M-1} \left( \sum_{j=0}^{N-1} (fj \cdot \phi ij) \right)^2 \right\} / \left\{ \sum_{j=0}^{N-1} fj^2 - \left( \sum_{j=0}^{N-1} fj \right)^2 / N \right\} \quad (4)$$

where fj indicates each element of the input voice pattern, and $\phi ij$ indicates each element of the reference pattern.

The input voice pattern to be subjected to recognition processing is stored in learning pattern memory 6 as a learning pattern. A voice pattern of a known category, which is input for learning, is also stored in memory 6. When a predetermined number of learning patterns of the identical category are stored in memory 6, pattern learning is performed. Standard patterns in memory 5 are updated by learning the patterns of the known category.

Pattern learning of the present invention is performed at high speed by special-purpose hardware (to be described later). Pattern learning processing of the present invention can be divided into (1) processing for obtaining covariance matrix K (in the present invention, this is slightly different from the mathematical definitions the term) from each of vowel and consonant pattern, and (2) processing for obtaining proper values or eigen values $\lambda$ and eigen vectors $\xi$ from covariance matrix K. Processing for obtaining N eigen values and N eigen vectors in the descendant order of the eigen values is generally called KL expansion.

Pattern learning processing of the present invention will be described in detail hereinafter.

Covariance matrix K of input voice patterns (learning patterns) is obtained as follows when the learning pattern is given by a column vector Sm:

$$K = (1/M) \sum_{m=1}^{M} Sm Sm^T = \quad (5)$$

$$(1/M) \sum_{m=1}^{M} \begin{pmatrix} Sm1 \\ Sm2 \\ \vdots \\ Smn \end{pmatrix} (Sm1 \; Sm2 \; \ldots \; Smn)$$

where M is the number of learning patterns and $Sm^T$ is a transposed vector or row vector of Sm. Learning pattern Sm is given by a column vector of 64 elements in the case of a consonant pattern, and is given by a column vector of 16 elements in the case of a vowel pattern.

The covariance matrix K is obtained by averaging the respective elements of a matrix prepared by a multiplication of the column and row vectors of the learning patterns for M learning patterns. Therefore, the number of elements of covariance matrix K equals the square of the number of elements of the above vectors.

Covariance matrix K can be rewritten as follows:

$$K = (1/M) \sum_{m=1}^{M} \begin{pmatrix} Sm1Sm1 & Sm1Sm2 & \ldots & Sm1Smn \\ Sm2Sm1 & Sm2Sm2 & \ldots & Sm2Smn \\ \ldots & \ldots & \ldots & \ldots \\ \ldots & \ldots & \ldots & \ldots \\ SmnSm1 & SmnSm2 & \ldots & SmnSmn \end{pmatrix} \quad (6)$$

The KL expansion of covariance matrix K is given by $$K = \lambda 1 \xi 1 \xi 1^T + \lambda 2 \xi 2 \xi 2^T + \ldots \lambda n \xi n \xi n^T \quad (7)$$

According to equation (7), covariance matrix K is expanded into n axes or components.

As described above, the KL expansion of covariance matrix K is processing for obtaining eigen values $\lambda$ and eigen vectors $\xi$ in the descendant order of eigen values $\lambda(\lambda 1 > \lambda 2 > \ldots > \lambda n)$.

In order to obtain covariance matrix K reflecting a distribution in patterns of a certain category, a considerable number of learning patterns are necessary. For this purpose, a predetermined number of learning patterns must be prestored in memory 6.

Even if a small number of learning patterns are stored, covariance matrix K can be updated to reflect the pattern distribution in accordance with sequentially input learning patterns. Calculation processing therefor is performed as follows:

$$K = (1-w)K' + \Sigma w Sn \cdot Sn^T \quad (8)$$

where w is a weighting coefficient for updating the covariance matrix, Sn is a newly input learning pattern, and K' is a covariance matrix before learning the learning pattern Sn. Weighting coefficient w can be either a positive or negative value. If coefficient w is positive, the similarity of the covariance matrix for the input pattern is increased; otherwise, the similarity is decreased. The covariance matrix of the patterns can also be prevented from being greatly influenced by newly input patterns.

Processing for obtaining the eigen values and eigen vectors from the covariance matrix thus obtained is then performed. A standard pattern used for the above-mentioned compound similarity calculation is prepared based on the eigen values and the eigen vectors. The standard pattern is obtained by KL expansion of covariance matrix K, more specifically, in the present invention, it is obtained by KL expansion using a power method "power method" meaning to repeatedly make calculations through use of equations (16) and (17) which are subsequently defined.

Assume that covariance matrix K has eigen values $\lambda 1, \lambda 2, \ldots, \lambda n$, and eigen vectors $\xi 1, \xi 2, \ldots, \xi n$ corresponding to these eigen values, as shown in equation (7).

Arbitrary vector u0 is defined as a linear combination of eigen vectors $\xi 1, \xi 2, \ldots, \xi n$ as follows:

$$u0 = \sum_{i=1}^{M} a i \xi i \quad (9)$$

Covariance matrix K, eigen vectors $\xi$ and eigen values $\lambda$ are related as follows:

$$K\xi i = \lambda i \xi i \quad (10)$$

In terms of $K^s u0$, $K^s u0$ is rewritten as follows:

$$\begin{aligned} K^s u0 &= K^s \left( \sum_{i=1}^{n} ai\xi i \right) = K^{s-1} \left( \sum_{i=1}^{n} ai K\xi i \right) \\ &= K^{s-1} \left( \sum_{i=1}^{n} ai\lambda i\xi i \right) \\ &= \ldots = K^0 \sum_{i=1}^{n} ai\lambda i^s \xi i \end{aligned} \quad (11)$$

Eigen values have the following relationship:

$$|\lambda 1| > |\lambda 2| > \ldots > |r| > \ldots > |\lambda n| \quad (12)$$

Equation (11) is rewritten as:

$$K^s u0 = \lambda 1 \left[ a1\xi 1 + \sum_{i=2}^{n} ai(\lambda i/\lambda 1)^2 \xi i \right] \quad (13)$$

Since $|\lambda i/\lambda 1| < 1 (i=2, 3, \ldots, n)$, if s becomes sufficiently large, the second term of equation (13) is converged to 0. Therefore, $$K^{s+1}u0/K^s u0 = \lambda 1 \quad (14)$$

In addition, it will be understood that $K^s u0$ is proportional to eigen vector $\xi 1$.

When the above-mentioned calculation is executed, scale-out may occur during calculation.

For this reason, vector u0 is given by the unit vector as follows:

$$u0 = \begin{pmatrix} 1 \\ 0 \\ . \\ 0 \end{pmatrix} \quad (15)$$

The following calculations are repetitively executed.

$$vs+1 = Kus \quad (16)$$

$$us+1 = vs+1/bs+1 \quad (s=0, 1, 2, \ldots) \quad (17)$$

where bs+1 is an element having a maximum absolute value among elements of vector vs+1, and equation (17) means normalization of vector vs+1.

By substituting equation (16), equation (17) is rewritten as follows:

$$\begin{aligned} us + 1 &= vs + 1/bs + 1 = Kus/bs + 1 = Kvs/(bs + 1 \cdot bs) \\ &= \ldots = K^{s+1}u0/(bs + 1 \ldots b0) \end{aligned} \quad (18)$$

When equations (16) and (17) are repeatedly calculated, the following result can be obtained:

$$\lambda 1 \approx bs+1 \xi 1 \approx us+1 \quad (19)$$

After eigen value $\lambda 1$ having the largest absolute value and eigen vector $\xi 1$ corresponding thereto are obtained in this manner, eigen value $\lambda 2$ having the next largest absolute value and eigen vector $\xi 2$ corresponding thereto are obtained. In order to obtain $\lambda 2$ and $\xi 2$, already obtained $\lambda 1$ and $\xi 1$ must be eliminated from covariance matrix K. This can be achieved by:

$$K' = K - \lambda 1 \xi 1 \xi 1^T \qquad (20)$$

Since $\xi 1^T \xi i = 0 (i=2, 3, \ldots, n)$, equation (20) will be modified as follows:

$$K'\xi 1 = K\xi 1 - \lambda 1 \xi 1 \xi 1^T \xi 1 = \lambda 1 \xi 1 - \lambda 1 \xi 1 = \lambda 1 \xi 1 = 0$$

This means that eigen value $\lambda 1$ and eigen vector $\xi 1$ are eliminated from K' in equation (20).

In general, $$K'\xi i = K\xi i - \lambda 1 \xi \Xi 1^6 \xi i = \lambda i \xi i \ (i \neq 1) \qquad (21)$$

Therefore, as can be seen from equation (21), K' has eigen values satisfying $|\lambda 2| > |\lambda 3| > \ldots > |\lambda n|$. In this case, $\xi i$ is normalized.

If the conversion of the covariance matrix, indicated by equation (20), is performed each time an eigen value and an eigen vector are obtained, eigen values and eigen vectors corresponding thereto can be sequentially obtained in the descendant order of the eigen values.

Figure 2B:
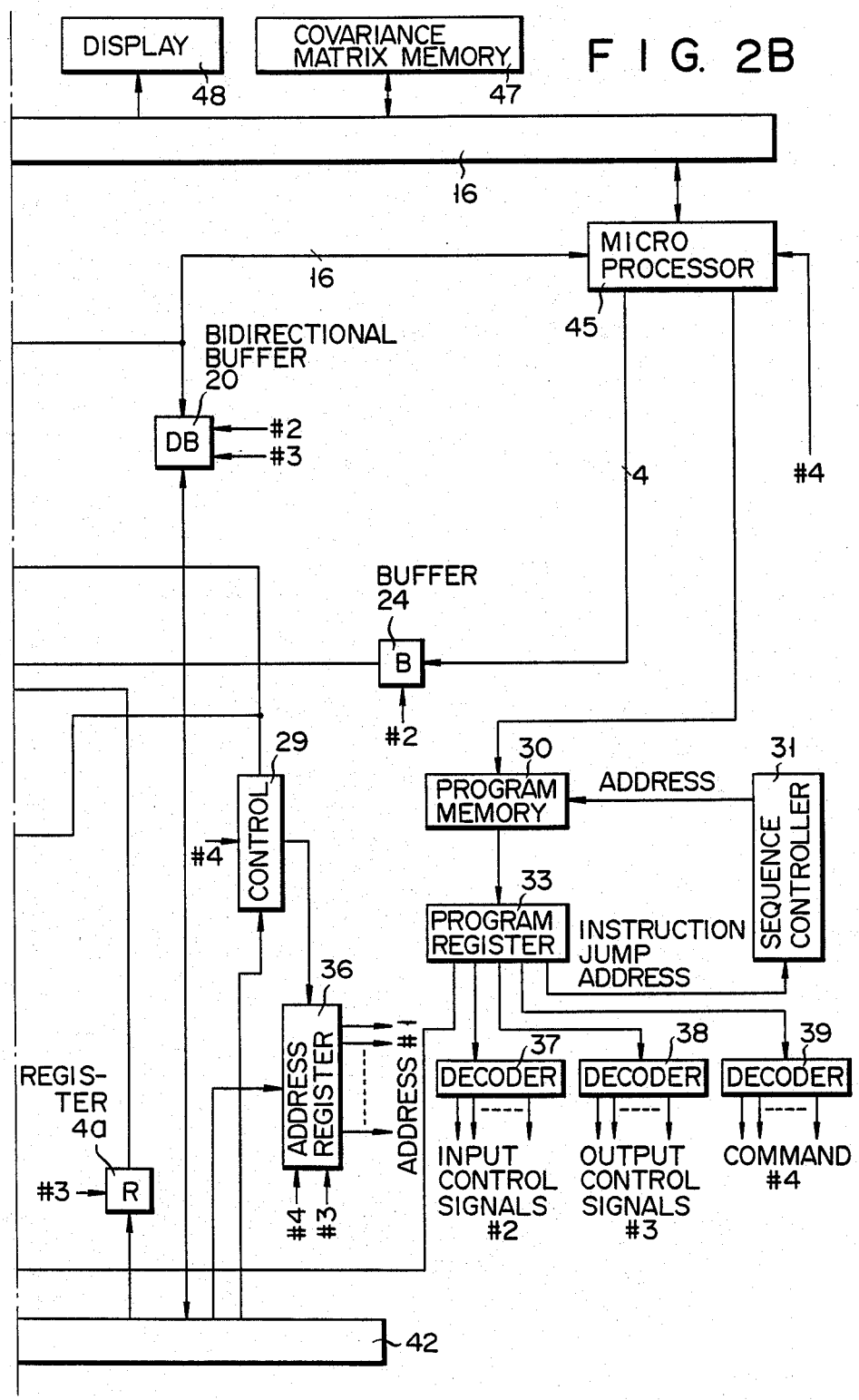

FIGS. 2A and 2B show a hardware arrangement of the present invention for performing the above-mentioned KL expansion processing, i.e., pattern learning processing (requiring sum-of-products calculation processing) at high speed. This hardware arrangement is also applied to various sum-of-products calculation processing necessary for calculating the similarity.

For KL expansion, there is a very large volume of multiplications of covariance matrix K and eigen vector $\xi$. For example, if vector $\xi$ has 64 dimensions, the repetitive number of calculations is 50 times, and the number of eigen values and eigen vectors (the number of axes or components in KL expansion) is 7, $64 \times 64 \times 50 \times 7$ of multiplications and additions are necessary. The hardware arrangement shown in FIGS. 2A and 2B can execute a large number of sum-of-products calculations necessary for similarity calculation and KL expansion processing at high speed.

Referring to FIGS. 2A and 2B, memories 11 to 15 for pattern recognition and learning are provided, and memories 11 to 14 are coupled to multi-bus 16 (e.g., IEEE-796). Microprocessor 45 is also coupled to bus 16 and, hence, can access memories 11 to 14 through bus 16. To bus 16 are coupled learning pattern memory 47 for storing a plurality of learning patterns for the same category and display 48 for displaying the recognition result. Microprocessor 45 executes segmentation of input voice patterns, learning processing, and recognition processing. Microprocessor 45 loads a program for operating entire hardware into program memory 30. Memory 30 loads program data into program register 33. Sequence controller 31 controls the sequence of hardware in response to an instruction and a jump address from register 33. Controller 31 supplies address data to program memory 30, and the corresponding data is read out from memory 30 in response thereto and is stored in register 33. Register 33 supplies instruction data to ALU (arithmetic logic unit) 41 and decoders 37, 38, and 39. Decoder 37 generates input control signals #2 for controlling data entry of various circuits. Decoder 38 generates output control signals #3 for controlling data output of the various circuits. Decoder 39 generates command control signals #4 for controlling the various circuits. Control signals #2, #3, and #4 are each a 1-bit signal.

Memories 11 to 15 receive a 16-bit address signal #1 from register 36 and input control signal #2, output control signal #3, and command control signal #4. An address of memories 11 to 15 are designated by an address signal #1, and the read/write operations thereof are governed by control signals #2 and #3. Command control signal #4 supplied to each of memories 11 to 15 is used for clearing the memory address designated by the address signal #1. Memories 11, 13, and 14 are each coupled to 16-bit data buses, memory 12 is coupled to an 8-bit data bus, and memory 15 is coupled to a 35-bit data bus. Memory 12 is a dictionary memory used for storing a vector as an eigen vector.

Selectors 18 and 19 select one of a plurality of inputs under the control of sum-of-products control circuit 29 responsive to an instruction supplied from ALU 41 through bus 42, and supply the selected inputs to input terminals A and B of sum-of-products circuit 21, respectively. Circuit 21 calculates sum-of-products of data received at terminals A and B under the control of control circuit 29. The outputs of selectors 18 and 19 are 16-bit outputs, and the output of sum-of-products circuit 21 is a 32-bit output. The output of circuit 21 is connected to shifter 23. Shifter 23 is a barrel shifter which is arranged to shift a 32-bit output of circuit 21 from 5-bit right shift to 2-bit left shift.

Selector 25 selects one of the output data of circuit 21, 5-bit right-shifted data of circuit 21, and upper 16-bit output data of shifter 23 under the control of control circuit 29. Selector 26 selects one of the output data of circuit 21, 5-bit right-shifted data of circuit 21, and data registered in register 22 (in this embodiment, 1) under the control of control circuit 29. The outputs of selectors 25 and 26 are respectively connected to input terminals A and B of sum-of-products circuit 32, and the sum of products of the input data is calculated under the control of control circuit 29. Lower and upper 16-bit data of circuit 32 are coupled to input buses 34 and 35 of ALU 41. Buses 34 and 35 are respectively connected to input terminals A and B of ALU 41. The output of ALU 41 is connected to output bus 42.

Upper 16-bit output data of shifter 23 is coupled to bus 35 through buffer 27 responsive to input control signal #2, and lower 16-bit output data thereof is coupled to bus 34 through buffer 28 responsive to input control signal #2.

Bidirectional buffer 43 is connected between memory 13 and output bus 42 of ALU 41. Buffer 43 controls a data-flow direction in response to input control signal #2 and output control signal #3. Bidirectional buffer 17, responsive to input control signal #2 and output control signal #3, is connected between memory 11 and bus 42. Bidirectional buffer 20, responsive to input control signal #2 and output control signal #3, is connected between microprocessor 45 and bus 42. Buffer 24 for storing a command from microprocessor 45 in response to input control signal #2 is connected between microprocessor 45 and bus 34. The command from microprocessor 45 is read by ALU 41 through bus 34, thereby determining the next operation of ALU 41. The buffer and the bidirectional buffers each have a tri-state output.

ALU 41 has, for example, 16 internal registers to execute arithmetic and logical operations, such as: subtraction, addition, multiplication, division, Exclusive OR, AND, OR, NAND, NOR, and comparison between registers; subtraction, addition, comparison, AND, OR, Exclusive OR, NOR, and NAND with a constant; 1-bit logical left rotate and logical right rotate, arithmetic left shift, arithmetic right shift, and so on.

Voice data including 16-channel vowel data for one frame, 8-channel consonant data, and data indicating voice power is extracted from feature extractor 46 to be stored in memory 44. The voice data is read out from memory 44 in response to input control signal #2 to be loaded to ALU 41 through bus 34.

Execution of various basic calculations necessary for the similarity calculation shown by equation (4) in the hardware arrangement shown in FIGS. 2A and 2B will be explained below.

Input voice data is fetched by ALU 41 from extractor 46 through memory 44 and bus 34. The voice data etched by ALU 41 is input to microprocessor 45 through output bus 42 and buffer 20. Microprocessor 45 segments the voice data based on voice power. Microprocessor 45 writes voice pattern data in memory 11 through multi-bus 16.

In the first step, $$\left[\sum_{j=0}^{N-1} fj^2\right]$$

is calculated. For this purpose, fj is read out from memory 11 to be supplied to sum-of-products circuit 21 through selectors 18 and 19. Circuit 21 calculates $fj^2$. A calculation is executed for respective elements of vector f stored in memory 11 while sequentially updating designation addresses of memory 11, in other words, while incrementing parameter j. The calculation result is supplied to sum-of-products circuit 32 through selector 25 without being shifted. In this step, circuit 32 does not perform an addition. In the case of a vowel, the above calculation is made for 16 elements of the vector to calculate $$\sum_{j=0}^{N-1} fj^2.$$

The 32-bit calculation result is stored in one register of ALU 41 through input buses 34 and 35. N in equation (4) corresponds to 16 in the case of a vowel.

In the second step, $$\left[\left(\sum_{j=0}^{N-1} fj\right)^2 / N\right]$$

is calculated. For this purpose, data fj is supplied to input terminal A of circuit 21 through selector 18. In this step, "1" stored in memory 13 is read out therefrom, and is supplied to circuit 21 through selector 19. As a result, $$\sum_{j=0}^{N-1} fj$$

is calculated by circuit 21 while updating addresses of memory 11.

5-bit right-shifted data of the output data of circuit 21 (this means rounding off of lower 5 bits) is supplied to input terminals A and B of sum-of-products circuit 32 through selectors 25 and 26. As a result, $$\left(\sum_{j=0}^{N-1} fj\right)^2$$

is calculated by circuit 32. The 32-bit calculation result is supplied to ALU 41 through input buses 34 and 35, and ALU 41 executes a division $$\left(\sum_{j=0}^{N-1} fj\right)^2 / N$$

to store it in one register thereof. In this calculation, rounding off of the output data of circuit 21 is performed so that the output data of circuit 32 does not exceed 32 bits.

In the next step, $$\left[\sum_{i=0}^{M-1} \left(\sum_{j=0}^{N-1} (fj \cdot \phi ij)\right)^2\right]$$

is calculated. For this purpose, vector elements $\phi ij$ of a reference pattern are supplied from reference pattern memory 12 storing reference patterns to circuit 21 through selector 19, and vector elements fj of a sample pattern in memory 11 are supplied to circuit 21 through selector 18. Circuit 21 calculates $$\sum_{j=0}^{N-1} fj \cdot \phi ij$$

while updating addresses of memories 11 and 12, in other words, while incrementing j. The calculation result is supplied to circuit 32 through selectors 25 and 26.

$$\left(\sum_{j=0}^{N-1} (fj \cdot \phi ij)\right)^2$$

is calculated by circuit 32, and $$\sum_{i=0}^{M-1} \left(\sum_{j=0}^{N-1} (fj \cdot \phi ij)\right)$$

is calculated by incrementing parameter i from 0 to M−1. The calculation result is stored in a register of ALU 41. ALU 41 calculates similarity $S^{(l)}[f]$ of sample pattern f in accordance with equation (4) using the calculated results described above. The calculated similarity is stored at a predetermined location in memory 14 from ALU 41 through output bus 42 and bi-directional buffer 20. ALU 41 instructs the end of similarity calculation to microprocessor 45. Thus, microprocessor 45 accesses memory 14 to write the similarity in the internal memory, and performs recognition of the category of sample pattern f.

Pattern learning is to prepare a reference pattern from a plurality of voice sample patterns for a given category. The prepared reference pattern is registered in reference pattern memory or dictionary memory 12. For the purpose of pattern learning, microprocessor 45 stores an appropriate number of sample patterns for each category in learning pattern memory 47. The number M of learning patterns of a given category is preferably 10 to 20. In the present invention, pattern learning is performed by KL expansion using a power method.

Figure 3B:
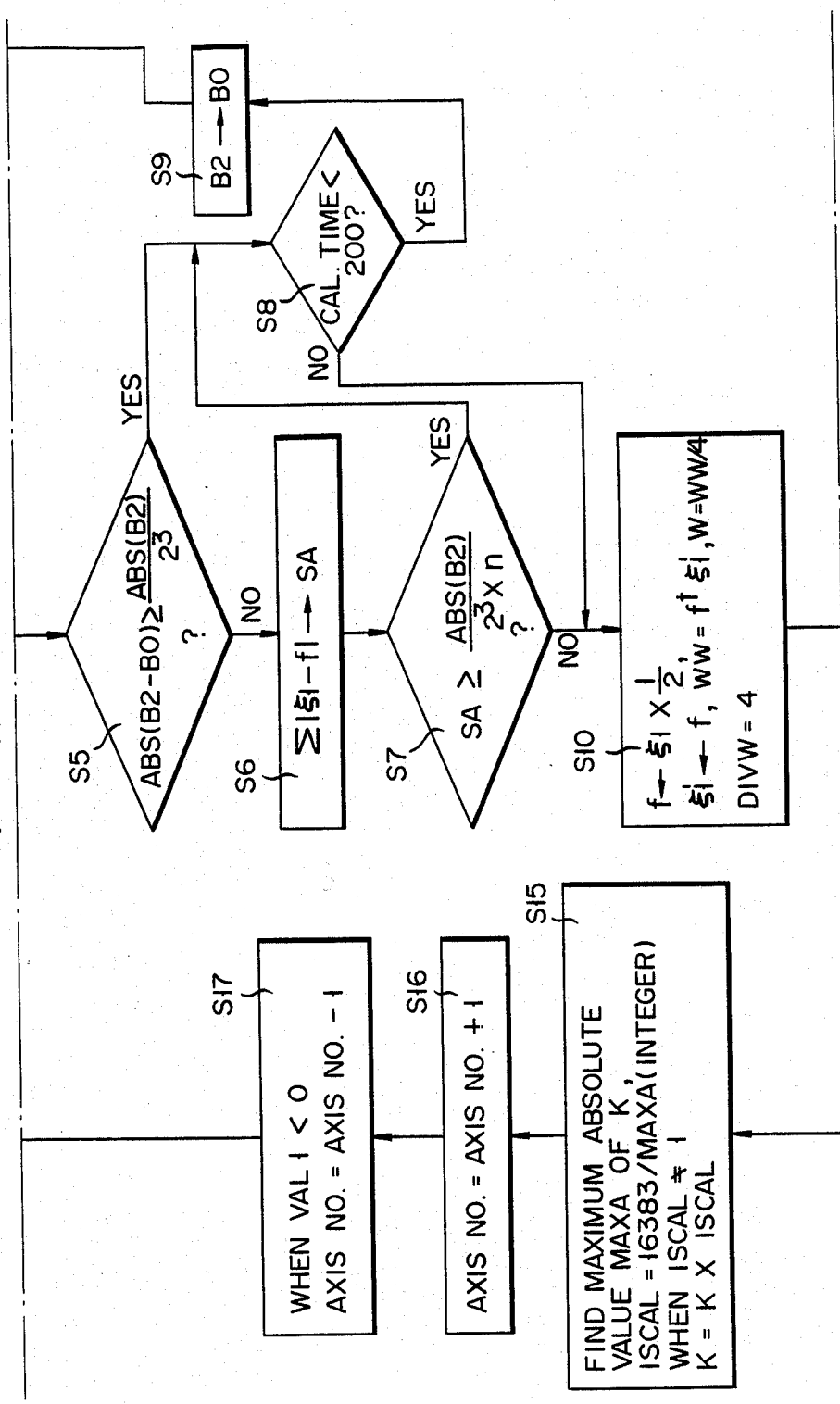

Pattern learning processing by means of KL expansion using a power method according to the present invention will be described with reference to the flow chart shown in FIGS. 3A, 3B and 3C.

In step S1, the initial value of the number of axes or components, AXIS No. of KL expansion of covariance matrix K is set to 1. This value is loaded to one register of ALU 41 from microprocessor 45. The number of axes or components of KL expansion corresponds to n in equation (7). Setting the initial value to 1 means to calculate maximum eigen value $\lambda 1$ and eigen vector $\xi 1$. In step S1, the maximum number of axes or components to be calculated is also set in another register of ALU 41. In equation (7), the maximum number of components is indicated by n. In the case of a vowel, the number of components to be obtained is preferably 4, and in the case of a consonant, 7. Accumulation magnification coefficient MISCAL "1" used for KL expansion of covariance matrix K is set in a register of ALU 41. Covariance matrix K is loaded to memory 13 from covariance matrix memory 47 through bus 16. Matrix K is expressed by equation (6). The n elements Sm1Sml to SmnSml of the first column of matrix K stored in memory 13 are copied into memory 14 through bus 16. This amounts to loading of a result obtained by multiplying unit vector u0 represented by equation (15) with matrix K in memory 14.

In step S2, value B0 of the maximum element of vector $\xi 2$ (to be calculated later) is set to 0. This value is set in one register of ALU 41. The value of one register of ALU 41 indicating the number of calculation times (CAL.TIME) is set to an initial value 0. The maximum number of the calculation times is set to e.g., 200. This value is also set in the register of ALU 41. The number of calculation times corresponds to s in equation (11).

In step S3, $\xi 2 = K\xi 1$ is calculated. Matrix K stored in memory 13 is supplied to input terminal A of circuit 21 through selector 18, and $\xi 1$ stored in memory 14 is supplied to input terminal B of circuit 21 through selector 19, so that circuit 21 calculates $\xi 2 = K\xi 1$. Each element of matrix K is written 15 bits and each element of vector $\xi 1$ has 16 bits. And, each element of $K\xi 1$ has not more than B 35 bits. Each element of vector $\xi 2$ is transferred from circuit 21 to memory 15. Vector $\xi 2$ calculated is used for the next calculation as vector $\xi 1$. For this purpose, each element of vector $\xi 2$ must have less than 16 bits.

Each element of vector $\xi 2$ is fetched by ALU 41 from memory 15 through shifter 23 (at this time, a shift amount is 0) and upper 16-bit buffer 27. ALU 41 compares the respective elements of vector $\xi 2$ in magnitude in terms of upper 16 bits. Then, an element having a maximum absolute value of vector $\xi 2$ is detected and is given by B1. The absolute value of B1 is given by ABS(B1). ALU 41 sets the shift amount of shifter 23 with reference to maximum absolute value ABS(B1) so that the maximum value of the absolute value of each element of vector $\xi 2$ is below 536870912 ($=2^{29}-1$). In other words, the shift amount is determined so that the maximum value has not more than 30 bits. The maximum element of vector $\xi 2$ is fetched by ALU 41 through shifter 23 and upper and lower 16-bit buffers 27 and 28. Next, each element of vector $\xi 2$ is fetched by ALU 41 from memory 15 through shifter 23 and buffers 27 and 28. ALU 41 divides each element of vector $\xi 2$ with the maximum element so that the maximum value of elements of vector $\xi 2$ yields 32767 ($=2^{15}-1$) or $-32767$. In other words, each element of vector $\xi 2$ is divided to have not more than 16 bits. This means normalization represented by equation (17). Calculation $\xi 2 = K\xi 1$ corresponds to that of equation (16). ALU 41 stores each element of vector $\xi 2$ converted into 16 bits as described above in memories 11 and 14 through buffers 17 and 20, respectively. The value (CAL.TIME) of the register of ALU 41 indicating the number of calculation times is incremented by 1.

In step S4, the same calculation as in step S3 is executed. More specifically, $\xi 2 = K\xi 1$ is calculated using vector $\xi 1$ stored in memory 14. Next, element B2 having the maximum absolute value of vector $\xi 2$ is calculated, and its absolute value is set to ABS(B2). As in step S3, the shift amount of shifter 23 is set and each element of vector $\xi 2$ is processed not to exceed 16 bits. New vector $\xi 2$ calculated in step S4 is stored in memory 14. The number of calculation times (CAL.TIME) is incremented by 1. With the above processing, calculations of equations (16) and (17) have been performed twice.

Convergence is checked next. Convergence check is performed in two steps, e.g., coarse check and fine check steps. The first coarse check step is performed in step S5. Difference ABS(B2−B0) between maximum absolute value ABS(B2) obtained in step S4 and maximum absolute value B0 set in step S2 (corresponding to the maximum absolute value obtained in the second previous step from step S4) is compared with a $1/\beta$ multiple of ABS(B2) (e.g., $\beta = 2^3$) obtained in step S4. If ABS(B2−B0) $\geq$ ABS(B2)/$2^3$, it is determined that the maximum absolute value (maximum eigen value) is not yet converged, and checking of step S8 is performed. It is checked in step S8 if calculations are made a predetermined maximum number of times (in this embodiment, 200 times). This means that a maximum of 200 calculations is allowed. If 200 calculations are not yet performed, the maximum absolute value detected in step S4 is loaded to the register of ALU 41 in step S9. Until the first-stage check in step S5 is cleared, steps S3, S4, S8, and S9 are repeated. This means the calculation of equation (18). If it is determined in step S5 that ABS(B2−B0)<ABS(B2)/$2^3$, the operation advances to the second-stage check step.

In step S6, sum SA of differences between respective elements of vector $\xi 2$ obtained in step S3 and stored in memory 11 (to be referred to as vector f hereinafter) and vector $\mu 2$ obtained in step S4 and stored in memory 14 (to be referred to as vector $\xi 1$ hereinafter) is obtained. This calculation can be performed such that the contents of memories 11 and 14 are fetched by ALU 41 through bidirectional buffers 17 and 20. Subsequently, in step S7, SA is compared with ABS(B2)/$\gamma$ (for example, $\gamma = 2^3 \times n$, and n is the number of dimensions of the vector and 16 in the case of a vowel). If SA<ABS(B2)/($2^3 \times$n), it is determined that the maximum value is converged. If convergence is not detected, the calculation times are checked. If the number of calculation times has not reached 200, steps S9, S3 and S4 are repeated. If it is determined in step S8 that the number of calculation times has reached 200, the flow is forcibly ended.

If convergence of vector $\xi 1$ is confirmed, the norm of vector $\xi 1$ is calculated in step S10. For this purpose, vector $\xi 1$ stored in memory 14 in step S4 is fetched by ALU 41 through bidirectional buffer 20. In ALU 41, each 16-bit element of vector $\xi 1$ is multiplied by $\frac{1}{4}$ through a 1-bit right shift operation. This is to prevent overflow in the calculation of the sum of squares. Thereafter, $\xi 1 \times \frac{1}{4}$ is stored in memory 11(f) from ALU 41 through bidirectional buffer 17. $\xi 1\frac{1}{2}$ is transferred from memory 11 to a location in memory 14 different from that at which vector $\xi 1$ is stored. $\xi 1 \times \frac{1}{2}$ stored in memory 14 is referred to as vector $\xi 1'$ hereinafter. Vector $f(\xi 1\frac{1}{2})$ in memory 11 and vector $\xi 1'$ stored in memory 14 are supplied to sum-of-products circuit 21 respectively through selectors 18 and 19, so that the square of norm $WW = f^T \xi 1'$ is calculated. $f^T \xi 1'$ corresponds to $1/16 \times f^T \xi 1$ using vector $\xi 1$ obtained in step S4. $f^T \xi 1'$ obtained by circuit 21 is 2-bit right-shifted by shifter 23 to yield $W = WW/4$. This result is fetched by ALU 41 through buffers 27 and 28. ALU 41 sets coefficient DIVW=4 depending on the shift amount of shifter 23 in its register.

In step S11, in ALU 41 $W = WW/4$ is compared with 1073610756(=32766$^2$). This corresponds to check as to whether the square root of W exceeds 16 bits or not. If $W < 1073610756$, since the square root of W does not exceed 16 bits, the operation advances to step S13. However, if $W \geq 1073610756$, since the square root of W exceeds 16 bits, step S12 is executed. ALU 41 right-shifts W by 2 bits in accordance with its shift command so that $W = W/4$ is obtained. Coefficient DIVW is set to 8. This value corresponds to the shift amount of W in shifter 23 and ALU 41.

In step S13, square root $RW = SQRT(W)$ of W is calculated by ALU 41. Square root RW must not exceed 16 bits, in other words, must be equal to or less than 32766. $W1 = 640000000/DIVW$ is calculated, and then $W1' = W1/RW$ is calculated. In ALU 41, $VAL1 = B2 \times 2^{SHIFT}$ is calculated for the maximum value B2 of vector $\xi 2$ obtained in step S4. SHIFT indicates a value set in register 30 by ALU 41. The shift amount of shifter 23 is determined in accordance with the value of SHIFT. SHIFT 0, 1, 2, 3, 4, 5, 6, and 7 indicate 5-bit right shift, 4-bit right shift, 3-bit right shift, 2-bit right shift, 1-bit right shift, no shift, 1-bit left shift, and 2-bit left shift, respectively. Shifter 23 performs shift corresponding to an amount depending on value SHIFT set in register 30. If the number of axes is 1, eigen value VAL11 of first axis in KL expansion is set to VAL1. VAL11 is stored in ALU 41. ALU 41 performs the following calculation.

$$(\phi) = (\xi 1) \times (VAL1/VAL11) \times (1/MISCAL) \times (W1'/10000) \quad (22)$$
$$= (\xi 1) \times (VAL1/VAL11) \times 64000/(RW \times DIVW)$$

This calculation is made for normalizing vector $\xi 1$ by the norm so that the sum of squares of each element is constant for each category and axis. In this embodiment, the sum of squares of each element, i.e., the norm, is normalized to 64000. ALU 41 sends this calculated vector to microprocessor 45 through buffer 20, and microprocessor 45 stores it in dictionary memory 12.

In step S14, ALU 41 sets WSIFT in accordance with $W = WW/4$ obtained in step S12. Then, $EDIV = W \times 2^{WSIFT}$ is calculated, and the following calculation of vector f is made in accordance with its upper 16 bits $UEDIV = EDIV/2^{16}$.

$$(f) = -VAL1 \times (\xi 1)/UEDIV \quad (23)$$

Vector f is stored in memory 11 from ALU 41 through bidirectional buffer 17.

A calculation for eliminating the eigen value and the eigen vector of the first axis from covariance matrix K is performed as follows:

$$(K) = (K) + (\xi 1)(f) \times 2^{3+WSIFT-SIFT}/2^{19} \quad (24)$$

More specifically, vector f stored in memory 11 and vector $\xi 1$ stored in memory 14 are supplied to circuit 21 respectively through selectors 18 and 19, thereby calculating $\xi 1 f$. At this time, the shift amount of shifter 23 is set to $3 + WSIFT - SIFT$, and $\xi 1 f \times 2^{3+WSIFT-SIFT}$ can be obtained from shifter 23, which is a 35-bit output. Upper 16 bits are coupled to selector 35. This amounts to multiplication of the second term of the above equation with $\frac{1}{2}^{19}$. Covariance matrix K is preloaded to input terminal B of circuit 32. As a result, equation (24) is calculated by circuit 32, and the calculation result is returned to memory 13. This calculation corresponds to equation (19).

In step S15, new covariance matrix K obtained by equation (24) is supplied from memory 13 to ALU 41 through buffer 43. ALU 41 calculates maximum absolute value MAXA from elements of matrix K. Subsequently, $ISCAL = 16383/MAXA$ (integer) is calculated. If $ISCAL \neq 1$ or 0, the following calculation is made of each element of matrix K:

$$K = K \times ISCAL \quad (25)$$

If $ISCAL = 0$, this is considered as $ISCAL = 1$. $K = K \times ISCAL$ is stored in memory 13 through buffer 43. Coefficient MISCAL is multiplied with ISCAL. Step S15 is executed for the following purpose. More specifically, each time an eigen value and an eigen vector are obtained during KL expansion processing of matrix K, a subtraction of matrix K is executed in step S14. For this reason, the elements of matrix K are gradually decreased. This degrades precision of the following calculations. In order to obtain the eigen value and the eigen vector of each axis of KL expansion with high precision, it is required that each element of matrix K does not become too small. For this purpose, the elements of matrix K are multiplied with ISCAL in step S15. As indicated by equation (22), each element of vector $\xi 1$ is multiplied with 1/MISCAL in step S13, thereby correcting a magnification.

In step S16, the number of axes set in ALU 41 is incremented by 1. In step S17, if eigen value VAL1 obtained in step S13 is a negative value, the number of axes is decremented by one. It is then checked in step S18 if the number of axes has reached the prescribed number of axes (in the case of a vowel, 4; in the case of a consonant, 7). If the prescribed number of axes is reached, KL expansion is ended. If the eigen values and eigen vectors up to the prescribed number of axes are not yet obtained, the operation returns to step S2, and the calculation of the eigen value and eigen vector of the next axis is executed. The eigen value and the eigen vector for each axis obtained described above are stored in dictionary memory 12.

What is claimed is:

1. A method of obtaining a reference pattern from a plurality of input patterns of a specific category, comprising the steps of:
    a first step of obtaining a covariance matrix K of said plurality of input patterns of the specific category, said covariance matrix K having a elements in n columns and n rows;

a second step of multiplying said covariance matrix K by a first vector $\xi 1$ consisting of elements of a first column of said covariance matrix to obtain a second vector $\xi 2$;

a third step of obtaining a first maximum element of absolute value ABS(B1) in said second vector $\xi 2$;

a fourth step of multiplying said covariance matrix by said second vector $\xi 2$, obtained in said second step, to obtain a third vector $\xi 3$;

a fifth step of obtaining a second maximum element or absolute value ABS(B2) of said third vector $\xi 3$;

a sixth step of determining convergence of said second vector and said third vector obtained in said second and fourth steps, respectively, said convergence being determined by obtaining a first value and a second value from the first maximum element of absolute value ABS(B1) and from the second maximum element of absolute value ABS(B2) which are obtained in said third and fifth steps, respectively, and comparing the first value with the second value;

a seventh step of repeatedly performing calculations in said second and fourth steps within a predetermined calculation time, if the convergence of said second vector and said third vector does not occur in said sixth step;

an eighth step of storing said vector obtained in said fourth step as an eigen vector of a first axis and said maximum element in absolute value of said vector as an eigdn value of said first axis in a directionary memory, when the convergence is determined in said sixth step;

a ninth step of obtaining a new covariance matrix K' adapted for obtaining eigen vectors and eigen values of axes subsequent to the first axis, by subtracting the eigen vector and eigen value of the first axis from said covariance matrix K;

a tenth step of determining whether eigen vectors and eigen values for a predetermined number of axes have been obtained; and an eleventh step, a power method step, of sequentially obtaining eigen vectors and eigen values up to the predetermined number of axes by repeating steps corresponding to said second to tenth steps with respect to said new covariance matrix K', when it is determined in said tenth step that the eigen vectors and eigen values have not been obtained up to the predetermined number of axes.

2. A method according to claim 1, wherein said sixth step includes the steps of:

comparing a difference between the second maximum element of absolute value ABS(B2) obtained in said fifth step and a maximum element of absolute value ABS(B0) of the second vector $\xi 2$ prior to the calculation in said fourth step with a predetermined value.

3. A method according to claim 2, further comprising the steps of:

obtaining a sum of absolute values of differences of respective elements in said second vector and said third vector obtained in said second and fourth steps; and comparing the sum of absolute value of differences of respective elements of said second vector and said third vector with a predetermined value.

4. A method according to claim 1, wherein said eighth step includes the step of:

normalizing each element of the third vector obtained in said fourth step with the norm of the third vector.

5. A method according to claim 1, wherein said third and fifth steps include the step of:

normalizing each element of the second vector and the third vector in accordance with the first maximum element of absolute value ABS(B1) and the second maximum element of absolute value ABS(B2), respectively.

6. A method according to claim 1, further comprising the steps of:

a step of obtaining a new maximum element of absolute value of the new covariance matrix K', obtained in said ninth step; and normalizing each element of the new covariance matrix K', with the new maximum element of absolute value.

7. A reference pattern learning apparatus for obtaining a reference pattern from a plurality of input patterns of a specific category comprising:

means for providing a covariance matrix K from said plurality of input patterns of the specific category;

means responsive to said covariance matrix K for obtaining eighen values and eigen vectors of a predetermined number of axes in Karhunen-Loeve expansion of said covariance matrix K by repeatedly performing the following calculations given by $$V s+1 = K\ Us$$

$$U s+1 = V s+1/b\ s+1\ (s=0, 1, 2, \ldots)$$

where U0 (s=0) represents a unit vector and b s+1 represents a maximum element in absolute value of said vector V s+1; and means for storing the eigen value and eigen vector of each axis obtained in the calculations in a dictionary memory.

8. An apparatus according to claim 7, wherein: the calculations are performed by a first sum-of-products operation circuit and a second sum-of-products operation circuit, each operation circuit having first and seocnd inputs and calculating a sum-of-products of numerical data applied to said first and second inputs thereof, said second sum-of-products operation circuit being arranged on an output side of said first sum-of-products operation circuit; and an arithmetic logic unit being arranged on an output side of said second sum-of-products operation circuit.

9. A pattern recognition apparatus comprising:

means for providing a plurality of input patterns;

pattern recognizing means for recognizing the input patterns, using reference patterns stored in reference pattern memory means; and pattern learning means for learning the input patterns, to form the reference patterns form the input patterns;

said pattern learning means including means for obtaining a covariance matrix of the input patterns, and means for performing a Karhunen-Loeve expansion of the covariance matrix, using a power method, to obtain a reference pattern corresponding to a category of the input patterns.

* * * * *